(12) United States Patent
Wassermann et al.

(10) Patent No.: US 8,038,951 B2
(45) Date of Patent: Oct. 18, 2011

(54) CATALYST COMPOSITIONS

(75) Inventors: Knut Wassermann, Princeton, NJ (US); Stephen Siemund, Pattensen (DE); Michel Deeba, East Brunswick, NJ (US); Harold Rabinowitz, Montclair, NJ (US)

(73) Assignee: BASF Corporation, Florham Park, NJ (US)

( * ) Notice: Subject to any disclaimer, the term of this patent is extended or adjusted under 35 U.S.C. 154(b) by 465 days.

(21) Appl. No.: 12/014,295

(22) Filed: Jan. 15, 2008

(65) Prior Publication Data

US 2009/0041645 A1    Feb. 12, 2009

Related U.S. Application Data

(63) Continuation-in-part of application No. 11/836,476, filed on Aug. 9, 2007.

(51) Int. Cl.
| | |
|---|---|
| B01D 50/00 | (2006.01) |
| B01D 53/34 | (2006.01) |
| F01N 3/00 | (2006.01) |
| F01N 3/10 | (2006.01) |
| F23J 11/00 | (2006.01) |
| B01J 23/00 | (2006.01) |
| B01J 23/44 | (2006.01) |
| B01J 23/42 | (2006.01) |
| B01D 53/56 | (2006.01) |
| B01D 53/94 | (2006.01) |
| B01J 8/02 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| C01G 28/00 | (2006.01) |
| C01G 30/00 | (2006.01) |

(52) U.S. Cl. ........ 422/168; 422/169; 502/304; 502/333; 502/339; 502/349; 502/325; 60/299; 60/302; 423/213.5; 423/213.7

(58) Field of Classification Search ................... 502/325, 502/333, 339, 302–304, 349; 423/213.5, 423/213.7; 422/168–170, 177, 180; 60/299, 60/302

See application file for complete search history.

(56) References Cited

U.S. PATENT DOCUMENTS

| | | |
|---|---|---|
| 4,171,288 A | 10/1979 | Keith et al. |
| 4,708,946 A | 11/1987 | Ohata et al. |
| 4,714,694 A | 12/1987 | Wan et al. |
| 4,727,052 A | 2/1988 | Wan et al. |
| 4,923,842 A | 5/1990 | Summers |
| 5,057,483 A | 10/1991 | Wan |
| 5,128,306 A | 7/1992 | Dettling et al. |
| 5,254,519 A | 10/1993 | Wan et al. |
| 5,407,880 A | 4/1995 | Ikeda et al. |
| 5,597,771 A | 1/1997 | Hu et al. |
| 5,898,014 A | 4/1999 | Wu et al. |
| 5,948,377 A | 9/1999 | Sung |
| 5,948,723 A | 9/1999 | Sung |
| 5,981,427 A | 11/1999 | Sung et al. |
| 5,989,507 A | 11/1999 | Sung |
| 6,087,298 A | 7/2000 | Sung et al. |
| 6,110,862 A | 8/2000 | Chen et al. |
| 6,248,688 B1 | 6/2001 | Wu et al. |
| 6,335,305 B1 | 1/2002 | Suzuki et al. |
| 6,375,910 B1 | 4/2002 | Deeba et al. |
| 6,478,874 B1 | 11/2002 | Rosynsky et al. |
| 6,492,297 B1 | 12/2002 | Sung |
| 6,497,851 B1 | 12/2002 | Hu et al. |
| 6,524,992 B2 | 2/2003 | Mussmann et al. |
| 6,569,392 B1 | 5/2003 | Li et al. |
| 6,585,944 B1 * | 7/2003 | Nunan et al. ............... 423/239.1 |
| 6,625,976 B1 | 9/2003 | Anderson et al. |
| 6,680,036 B1 | 1/2004 | Fisher et al. |

(Continued)

FOREIGN PATENT DOCUMENTS

WO    WO-95/35152    12/1995

OTHER PUBLICATIONS

Non-Final Office Action in U.S. Appl. No. 11/836,397, (Feb. 27, 2009), 8 pgs. Non-Final Office Action in U.S. Appl. No. 11/836,476, dated Apr. 16, 2010, 12 pp.
PCT International Search Report dated May 29, 2009 in PCT/US2008/072195, 6 pgs.

*Primary Examiner* — Stanley Silverman
*Assistant Examiner* — Anthony J Zimmer
(74) *Attorney, Agent, or Firm* — Karen M. Whitney; Diehl Servilla LLC; Melanie L. Brown

(57) ABSTRACT

Provided are catalyst composites comprising: a catalytic material on a carrier, the catalytic material comprising a precious metal selected from a palladium component and an oxygen storage component, the oxygen storage component being present in an amount of at least 10% by weight, wherein substantially all of the oxygen storage component is in intimate contact with the palladium component and the catalytic material is effective to substantially simultaneously oxidize carbon monoxide and hydrocarbons and reduce nitrogen oxides. A catalyst composite comprising: a catalytic material on a carrier, the catalytic material comprising a palladium component and a ceria-zirconia composite support, the ceria being present in an amount in the range of 10 to 70% by weight, wherein substantially all of the ceria is in intimate contact with at least a portion of the palladium component. Methods of making and using these catalysts along with systems containing these catalysts are also provided.

16 Claims, No Drawings

U.S. PATENT DOCUMENTS

| | | |
|---|---|---|
| 6,692,712 B1 | 2/2004 | Anderson |
| 6,764,665 B2 | 7/2004 | Deeba et al. |
| 6,777,370 B2 | 8/2004 | Chen |
| 6,923,945 B2 | 8/2005 | Chen |
| 7,022,646 B2 | 4/2006 | Li |
| 7,189,376 B2 | 3/2007 | Kumar et al. |
| 2001/0036432 A1 | 11/2001 | Hu et al. |
| 2003/0125202 A1 | 7/2003 | Ruwisch et al. |
| 2003/0175192 A1 | 9/2003 | Hu et al. |
| 2004/0186016 A1 | 9/2004 | Bog et al. |
| 2004/0223897 A1 | 11/2004 | Yeo |
| 2005/0059547 A1 | 3/2005 | Kuno |
| 2005/0164879 A1 | 7/2005 | Chen |
| 2005/0227867 A1 | 10/2005 | Chen et al. |
| 2005/0282701 A1 | 12/2005 | Foong et al. |
| 2006/0052243 A1 | 3/2006 | Muhammed et al. |
| 2006/0217263 A1 | 9/2006 | Kawamoto et al. |
| 2007/0014705 A1 | 1/2007 | Chen |
| 2007/0093382 A1 | 4/2007 | Vanderspurt |
| 2007/0099298 A1 | 5/2007 | Suzuki |
| 2008/0044330 A1 | 2/2008 | Chen et al. |
| 2008/0219906 A1 | 9/2008 | Chen et al. |

\* cited by examiner though many of these materials suffer from the disadvantage of having a considerably lower BET surface area than activated alumina, that disadvantage tends to be offset by a greater durability of the resulting catalyst.

CATALYST COMPOSITIONS

CROSS-REFERENCE TO RELATED APPLICATIONS

This application is a continuation-in-part of U.S. patent application Ser. No. 11/836,476, filed Aug. 9, 2007, which is hereby incorporated by reference in its entirety.

TECHNICAL FIELD

This invention pertains generally to catalysts used to treat gaseous steams containing hydrocarbons, carbon monoxide, and oxides of nitrogen. More specifically, this invention is directed to three-way catalysts (TWC).

BACKGROUND

Three-way conversion (TWC) catalysts have utility in a number of fields including the treatment of exhaust gas streams from internal combustion engines, such as automobile, truck and other gasoline-fueled engines. Emission standards for unburned hydrocarbons, carbon monoxide and nitrogen oxide contaminants have been set by various governments and must be met by older as well as new vehicles. In order to meet such standards, catalytic converters containing a TWC catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

Known TWC catalysts which exhibit good activity and long life comprise one or more platinum group metals (e.g., platinum, palladium, rhodium, rhenium and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. TWC catalysts can be manufactured in many ways. U.S. Pat. No. 6,478,874, for example, sets forth a system for catalytic coating of a substrate. Details of a TWC catalyst are found in, for example, U.S. Pat. Nos. 4,714,694 and 4,923,842. U.S. Pat. Nos. 5,057,483; 5,597,771; 7,022,646; and WO95/35152 disclose TWC catalysts having two layers with precious metals. U.S. Pat. No. 6,764,665 discloses a TWC catalyst having three layers, including a palladium layer having substantially no oxygen storage components. U.S. Pat. No. 5,898,014 discloses catalyst compositions containing oxygen storage components. U.S. Pat. No. 5,597,771 provides a two-layered catalyst where one layer has a platinum group metal in intimate contact with an oxygen storage component, and in a second layer, it is essential that ceria is not in intimate contact with a platinum group metal.

The high surface area alumina support materials, also referred to as "gamma alumina" or "activated alumina," typically exhibit a BET surface area in excess of 60 square meters per gram ("m²/g"), often up to about 200 m²/g or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

In a moving vehicle, exhaust gas temperatures can reach 1000° C., and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith et al., U.S. Pat. No. 4,171,288, the entire content of which is incorporated herein by reference.

Bulk cerium oxide (ceria) is known to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694, naming C. Z. Wan et al. as inventors and incorporated herein by reference, discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. Nos. 4,727,052 and 4,708,946, each incorporated herein by reference.

Multilayered catalysts are widely used in TWC. It is a continuing goal to develop three-way conversion catalyst systems that have the ability to oxidize hydrocarbons and carbon monoxide while reducing nitrogen oxides to nitrogen. There is also a goal to utilize components of TWC catalysts, especially the precious metals, as efficiently as possible. Further, there is an ongoing need to develop three-way catalysts that are effective during cold start and rich transient conditions.

SUMMARY

Provided are three-way catalysts using a palladium component and an oxygen storage component (OSC) such as ceria such that substantially all of the oxygen storage component is in intimate contact with the palladium. Historically, at least a portion of the OSC was kept separate from the palladium. Catalysts in accordance with the present invention show improved $NO_x$, HC, and CO conversions compared to catalysts having OSC and palladium in the same washcoat, and where OSC was not intimately mixed with the palladium. Also provided are systems using these palladium and OSC catalysts in combination with a second catalyst composite having a rhodium component being present in a low amount.

In a first aspect, a catalyst composite comprises: a catalytic material on a carrier, the catalytic material comprising a palladium component and a ceria-zirconia composite support, the ceria being present in an amount in the range of 10 to 70% by weight, wherein substantially all of the ceria is in intimate contact with at least a portion of the palladium component and the catalytic material is effective to substantially simultaneously oxidize carbon monoxide and hydrocarbons and reduce nitrogen oxides.

Other aspects provide methods for treating a gas comprising hydrocarbons, carbon monoxide, and nitrogen oxides, the method comprising: contacting the gas in an exhaust stream of a gasoline engine with a catalytic material on a carrier, the catalytic material comprising a palladium component and a ceria-zirconia composite support, the ceria being present in an amount in the range of 10 to 70% by weight, wherein substantially all of the ceria is in intimate contact with at least a portion of the palladium component and the catalytic material is effective to substantially simultaneously oxidize carbon monoxide and hydrocarbons and reduce nitrogen oxides.

In another aspect, provided is a catalyst composite comprising: a catalytic material on a carrier, the catalytic material comprising a precious metal selected from a palladium component and an oxygen storage component, the oxygen storage component being present in an amount of at least 10% by weight, wherein substantially all of the oxygen storage component is in intimate contact with the palladium component and the catalytic material is effective to substantially simultaneously oxidize carbon monoxide and hydrocarbons and reduce nitrogen oxides.

In another aspect, provided is a method for treating a gas comprising hydrocarbons, carbon monoxide, and nitrogen oxides, the method comprising: contacting the gas in an exhaust stream of a gasoline engine with a catalytic material on a carrier, the catalytic material comprising a precious metal selected from a palladium component and an oxygen storage component, the oxygen storage component being present in an amount of at least 10% by weight, wherein substantially all of the oxygen storage component is in intimate contact with the palladium component and the catalytic material is effective to substantially simultaneously oxidize carbon monoxide and hydrocarbons and reduce nitrogen oxides.

A further aspect provides a method of making a catalyst composite, the method comprising: forming a catalytic material by associating an amount of a precious metal selected from a palladium component onto a support comprising an oxygen storage component and one or more of a promoter, stabilizer, or binder such that the catalytic material comprises the oxygen storage component in an amount of at least 10%; depositing the catalytic material on a carrier; and drying the catalytic material and the carrier to form the catalyst composite; wherein substantially all of the oxygen storage component is in intimate contact with the palladium component and the catalytic material is effective to substantially simultaneously oxidize carbon monoxide and hydrocarbons and reduce nitrogen oxides.

Another aspect provides an exhaust system effective to substantially simultaneously oxidize carbon monoxide and hydrocarbons and reduce nitrogen oxides, the system comprising a combination of a first composite and a second composite, wherein the first composite comprises a precious metal selected from a palladium component and an oxygen storage component, the oxygen storage component being present in an amount of at least 10% by weight, wherein substantially all of the oxygen storage component is in intimate contact with the palladium component; and the second composite comprises a catalytic material having a low amount of a rhodium component.

DETAILED DESCRIPTION

The present invention relates to catalytic materials, catalyst composites using the catalytic materials, and systems of composites of the type generally referred to as a three-way conversion catalyst having the capability of simultaneously catalyzing the oxidation of hydrocarbons and carbon monoxide and the reduction of nitrogen oxides. It has been found that the use of palladium in conjunction with an oxygen storage component provides synergistic effects for $NO_x$ and hydrocarbon conversion. In this regard, $NO_x$ conversions traditionally achieved by rhodium can be achieved with palladium in combination with OSC. In one or more embodiments, the catalytic material contains palladium as its primary precious metal, the catalytic material being substantially free of other precious metals. Reference to "substantially free of other precious metals" means that precious metals other than palladium, such as platinum and rhodium, may be present at a level of less than or equal to approximately 200 ppm to the extent that, for example, the presence of the other precious metals does not significantly increase the cost of the catalytic materials.

In a first aspect, a catalyst composite comprises: a catalytic material on a carrier, the catalytic material comprising a palladium component and a ceria-zirconia composite support, the ceria being present in an amount in the range of 10 to 70% by weight, wherein substantially all of the ceria is in intimate contact with at least a portion of the palladium component and the catalytic material is effective to substantially simultaneously oxidize carbon monoxide and hydrocarbons and reduce nitrogen oxides. In an embodiment, the ceria is present in an amount in the range of 20 to 50%. In other embodiments, a molar ratio of palladium to cerium in intimate contact is in the range of 1:3000 to 1:30 (in other embodiments, 1:300 to 1:35, 1:200 to 1:40, or even 1:100 to 1:50). Reference to molar ratio means the amount of moles of Pd (molecular weight of approximately 106) to cerium (molecular weight of approximately 140) present in the catalytic material that are considered being in intimate contact.

In a further embodiment, the ceria-zirconia composite comprises ceria in an amount of at least 5% by weight of the ceria-zirconia composite.

In a detailed embodiment, the ceria-zirconia composite further comprises lanthana, neodymia, praseodymia, samarium, yttria, or combinations thereof. The ceria-zirconia composite can comprise lanthana in an amount in the range of 1-10% by weight to the ceria-zirconia composite.

Another embodiment provides that the palladium component is associated onto the ceria-zirconia composite in an amount of at least 0.1% by weight of the ceria-zirconia composite.

Other embodiments provide that the catalytic material further comprises a high surface area refractory metal oxide. In one or more embodiments, the high surface area refractory metal oxide comprises an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria.

Further embodiments can further comprises a promoter selected from the group consisting of BaO, SrO, $La_2O_3$, $Nd_2O_3$, $Pr_6O_{11}$, $Y_2O_3$, $Sm_2O_3$, and combinations thereof.

Other aspects provide methods for treating a gas comprising hydrocarbons, carbon monoxide, and nitrogen oxides, the method comprising: contacting the gas in an exhaust stream of a gasoline engine with a catalytic material on a carrier, the catalytic material comprising a palladium component and a ceria-zirconia composite support, the ceria being present in an amount in the range of 10 to 70% by weight, wherein substantially all of the ceria is in intimate contact with at least a portion of the palladium component and the catalytic material is effective to substantially simultaneously oxidize carbon monoxide and hydrocarbons and reduce nitrogen oxides.

One aspect provides a catalyst composite comprising: a catalytic material on a carrier, the catalytic material comprising a precious metal selected from a palladium component and an oxygen storage component, the oxygen storage component being present in an amount of at least 10% by weight, wherein substantially all of the oxygen storage component is in intimate contact with the palladium component and the catalytic material is effective to substantially simultaneously oxidize carbon monoxide and hydrocarbons and reduce nitrogen oxides. In one or more embodiments, the catalytic material is substantially free of other precious metal components.

In one embodiment, emissions of carbon monoxide, hydrocarbons, and nitrogen oxides are reduced compared to a comparative composite comprising the palladium component and the oxygen storage component in an amount of at least 10% by weight, wherein a portion of the oxygen storage component is not in intimate contact with the palladium component.

In detailed embodiments, the oxygen storage component is present in an amount of at least 20 (or in other embodiments, 30, or even 40) % by weight.

Certain embodiments provide that the oxygen storage component comprises at least one ceria-zirconia composite. In a detailed embodiment, an amount of at least 25 (or in other embodiments, 30, 35, 40, 45, or even 50) % of the palladium component is associated onto the ceria-zirconia composite. Other detailed embodiments provide that the ceria-zirconia composite comprises ceria in an amount of at least 5 (in other embodiments 10, 20, 30, or even 40) % by weight of the ceria-zirconia composite. In one or more embodiments, the ceria-zirconia composite further comprises lanthana. The lanthana can be present in an amount in the range of 1 to 10 (or in other embodiments 3-8) % by weight of the ceria-zirconia composite.

One or more embodiments provide that the palladium component is present in an amount of at least 30 (in other embodiments, 50, or even 100) $g/ft^3$.

A detailed embodiment provides three layers of catalytic material on the carrier, the catalytic material comprising: an inner layer deposited on the carrier comprising a high surface area alumina support in an amount in the range of 10 to 50% by weight of the layer, at least one ceria-zirconia composite in an amount to deliver an oxygen storage component content in the layer in the range of 20 to 40% by weight, and one or more of a promoter, stabilizer, or binder, and optionally palladium in an amount in the range of 0 to 15% by weight of palladium in the catalytic material; a middle layer deposited on the inner layer comprising a palladium component in an amount in the range of 30 to 70% by weight of palladium in the catalytic material, a lanthana-stabilized high surface area alumina support in an amount in the range of 40 to 70% by weight of the layer, at least one ceria-zirconia composite in an amount to deliver an oxygen storage component content in the layer in the range of 10 to 20% by weight, and one or more of a promoter, stabilizer, or binder; and an outer layer deposited on the middle layer comprising a palladium component in an amount in the range of 30 to 70% by weight of palladium in the catalytic material, a zirconia-stabilized high surface area alumina support in an amount in the range of 50 to 80% by weight of the layer, at least one ceria-zirconia composite in an amount to deliver an oxygen storage component content in the layer in the range of 10 to 20% by weight, and one or more of a promoter, stabilizer, or binder.

Another detailed embodiment provides two layers of catalytic material on the carrier, the catalytic material comprising: an inner layer deposited on the carrier comprising a palladium component in an amount in the range of 30 to 70% by weight of palladium in the catalytic material, a lanthana-stabilized high surface area alumina support in an amount in the range of 10 to 40% by weight of the layer, at least one ceria-zirconia composite in an amount to deliver an oxygen storage component content in the layer in the range of 25 to 40% by weight, and one or more of a promoter, stabilizer, or binder; and an outer layer deposited on the inner layer comprising a palladium component in an amount in the range of 30 to 70% by weight of palladium in the catalytic material, a zirconia-stabilized high surface area alumina support in an amount in the range of 40 to 70% by weight of the layer, at least one ceria-zirconia composite in an amount to deliver an oxygen storage component content in the layer in the range of 10 to 20% by weight, and one or more of a promoter, stabilizer, or binder.

Another detailed embodiment provides that the catalytic material comprises a palladium component in an amount in the range of 30 to 70% by weight of palladium in the catalytic material, a lanthana-stabilized high surface area alumina support in an amount in the range of 10 to 40% by weight of the layer, at least one ceria-zirconia composite in an amount to deliver an oxygen storage component content in the layer in the range of 25 to 40% by weight, and one or more of a promoter, stabilizer, or binder. A further embodiment includes this catalytic material comprising an inner layer deposited on the carrier and an outer layer deposited on the inner layer.

In another aspect, provided is a method for treating a gas comprising hydrocarbons, carbon monoxide, and nitrogen oxides, the method comprising: contacting the gas in an exhaust stream of a gasoline engine with a catalytic material on a carrier, the catalytic material comprising a precious metal selected from a palladium component and an oxygen storage component, the oxygen storage component being present in an amount of at least 10% by weight, wherein substantially all of the oxygen storage component is in intimate contact with the palladium component and the catalytic material is effective to substantially simultaneously oxidize carbon monoxide and hydrocarbons and reduce nitrogen oxides.

In one embodiment, the gas is at a temperature of 1100 (or in other embodiments, 1000, 900, 800)° C. or less. Another embodiment provides that the catalytic material is substantially free of other precious metal components.

A further aspect provides a method of making a catalyst composite, the method comprising: forming a catalytic material by associating an amount of a precious metal selected from a palladium component onto a support comprising an oxygen storage component and one or more of a promoter, stabilizer, or binder such that the catalytic material comprises the oxygen storage component in an amount of at least 10%; depositing the catalytic material on a carrier; and drying the catalytic material and the carrier to form the catalyst composite; wherein substantially all of the oxygen storage component is in intimate contact with the palladium component and the catalytic material is effective to substantially simultaneously oxidize carbon monoxide and hydrocarbons and reduce nitrogen oxides.

In a detailed embodiment, the catalytic material comprises three layers, and the method further comprises forming an inner layer slurry by mixing a high surface area alumina support, at least one ceria-zirconia composite in an amount to deliver an oxygen storage component content in the layer in the range of 20 to 40% by weight, and one or more of a promoter, stabilizer, or binder; depositing the inner layer slurry on the carrier; drying the inner layer slurry to form an inner layer; forming a middle layer slurry by impregnating a portion of the palladium component onto a lanthana-stabilized high surface area alumina support to form an impregnated lanthana-stabilized alumina support, mixing with the impregnated lanthana-stabilized alumina support at least one ceria-zirconia composite in an amount to deliver an oxygen storage component content in the layer in the range of 10 to 20% by weight and one or more of a promoter, stabilizer, or binder in an acetate solution; depositing the middle layer slurry on the inner layer; drying the middle layer slurry to form a middle layer; and forming an outer layer slurry by impregnating a portion of the palladium component onto a zirconia-stabilized high surface area alumina support to form an impregnated zirconia-stabilized alumina support; mixing with the impregnated zirconia-stabilized alumina support at least one ceria-zirconia composite in an amount to deliver an oxygen storage component content in the layer in the range of 10 to 20% by weight and one or more of a promoter, stabilizer, or binder in an acetate solution; depositing the outer layer slurry on the middle layer; and drying the outer layer slurry to form an outer layer.

Another detailed embodiment provides that the catalytic material comprises two layers, and the method further comprises forming an inner layer slurry by impregnating a portion of the palladium component onto a lanthana-stabilized high surface area alumina support to form an impregnated lanthana-stabilized alumina support, mixing with the impregnated lanthana-stabilized alumina support at least one ceria-zirconia composite in an amount to deliver an oxygen storage component content in the layer in the range of 25 to 40% by weight and one or more of a promoter, stabilizer, or binder in an acetate solution; and depositing the inner layer slurry on the carrier; drying the inner layer slurry to form an inner layer; forming an outer layer slurry by impregnating a portion of the palladium component onto a zirconia-stabilized high surface area alumina support to form an impregnated zirconia-stabilized alumina support, mixing with the impregnated zirconia-stabilized alumina support, at least one ceria-zirconia composite in an amount to deliver an oxygen storage component content in the layer in the range of 20 to 30% by weight and one or more of a promoter, stabilizer, or binder; depositing the outer layer slurry onto the inner layer; and drying the outer layer slurry to form an outer layer.

In another embodiment, the method further comprises forming a slurry by impregnating a portion of the palladium component onto a lanthana-stabilized high surface area alumina support to form an impregnated lanthana-stabilized alumina support, associating a portion of the palladium component onto a ceria-zirconia composite to form an associated oxygen storage component, and mixing with the impregnated lanthana-stabilized alumina support and the associated oxygen storage component, the remainder of the palladium component along with one or more of a promoter, stabilizer, or binder; depositing a portion of the slurry onto the carrier to form a first layer slurry; and drying the first layer slurry to form a first layer.

In a detailed embodiment, the method further comprises depositing a second portion of the slurry onto the first layer to form a second layer slurry and drying the second layer slurry to form a second layer.

Another aspect provides exhaust systems effective to substantially simultaneously oxidize carbon monoxide and hydrocarbons and reduce nitrogen oxides. Under certain conditions, such as high velocity through the system, systems containing Pd-only catalysts may realize excursions in $NO_x$ emissions. Reference to high velocity means flow the system at road conditions of approximately 65 miles per hour or greater. In one or more embodiments, the systems comprise a combination of a first composite and a second composite, wherein the first composite comprises a precious metal selected from a palladium component and an oxygen storage component, the oxygen storage component being present in an amount of at least 10% by weight, wherein substantially all of the oxygen storage component is in intimate contact with the palladium component; and the second composite comprises a catalytic material having a rhodium component being present in a low amount. A low amount of rhodium refers to less than 4 $g/ft^3$, and in a detailed embodiment, it refers to less than 2 $g/ft^3$. In one or more embodiments, the first composite is located upstream of the second composite. In a detailed embodiment, the rhodium component is present in an amount that is no more than 5% by weight of the total palladium component in the system. In an embodiment, the second composite further comprises another precious metal component selected from palladium, platinum, or both. A further embodiment provides that the second composite is layered, having a palladium component in a first layer and the rhodium component in the second layer.

Reference to a "support" in a catalyst layer refers to a material that receives precious metals, stabilizers, promoters, binders, and the like through association, dispersion, impregnation, or other suitable methods. Examples of supports include, but are not limited to, high surface area refractory metal oxides and composites containing oxygen storage components. One or more embodiments of the present invention include a high surface area refractory metal oxide support comprising an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Examples of composites containing oxygen storage components include, but are not limited to, ceria-zirconia, ceria-zirconia-lanthana. Reference to a "ceria-zirconia composite" means a composite comprising ceria and zirconia, without specifying the amount of either component. Suitable ceria-zirconia composites include, but are not limited to, composites having, for example, 5%, 10%, 15%, 20%, 25%, 30%, 35%, 40%, 45%, 50%, 55%, 60%, 65%, 70%, 75%, 80%, 85%, 90% or even 95% of ceria content. Certain embodiments provide that the support comprises bulk ceria having a nominal ceria content of 100% (i.e., >99% purity).

Reference to oxygen storage component (OSC) refers to an entity that has multi-valence state and can actively react with oxidants such as oxygen or nitrous oxides under oxidative conditions, or reacts with reductants such as carbon monoxide (CO) or hydrogen under reduction conditions. Examples of suitable oxygen storage components include ceria. Praseodymia can also be included as an OSC. Delivery of an OSC to the layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium.

Reference to "impregnated" means that a precious metal-containing solution is put into pores of a support. In detailed embodiments, impregnation of precious metals is achieved by incipient wetness, where a volume of diluted precious metal-containing is approximately equal to the pore volume of the support bodies. Incipient wetness impregnation generally leads to a substantially uniform distribution of the solution of the precursor throughout the pore system of the support. Reference to "intimate contact" includes having an effective amount of components in such contact (for example, Pd and OSC) on the same support, in direct contact, and/or in substantial proximity such that the OSC contacts oxygen components before the Pd component.

Details of the components of a gas treatment article and system according to embodiments of the invention are provided below.

The Carrier

According to one or more embodiments, the carrier may be any of those materials typically used for preparing TWC catalysts and will preferably comprise a metal or ceramic honeycomb structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic carrier may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α-alumina, aluminosilicates and the like.

The carriers useful for the layered catalyst composites of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically-promoting metal components to the carrier.

Preparation of Catalyst Composites

The catalyst composites of the present invention may be formed in a single layer or multiple layers. In some instances, it may be suitable to prepare one slurry of catalytic material and use this slurry to form multiple layers on the carrier. The composites can readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated.

The catalyst composite can be readily prepared in layers on a monolithic carrier. For a first layer of a specific washcoat, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 2.5 g/in$^3$ per dip. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Thereafter the coated carrier is calcined by heating, e.g., at 500-600° C. for about 1 to about 3 hours. Typically, when palladium is desired, the palladium component is utilized in the form of a compound or complex to achieve dispersion of the component on the refractory metal oxide support, e.g., activated alumina. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate. During the calcination step, or at least during the initial phase of use of the composite, such compounds are converted into a catalytically active form of the metal or a compound thereof.

A suitable method of preparing any layer of the layered catalyst composite of the invention is to prepare a mixture of a solution of a desired precious metal compound (e.g., palladium compound) and at least one support, such as a finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry.

In one embodiment, the slurry is thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 20-60 wt. %, more particularly about 30-40 wt. %.

Additional layers, i.e., the second and third layers may be prepared and deposited upon the first layer in the same manner as described above for deposition of the first layer upon the carrier.

Providing coated, multi-zoned catalyst substrates can be done by methods know in the art, for example, as described in U.S. Pat. No. 7,189,376, incorporated herein by reference.

Before describing several exemplary embodiments of the invention, it is to be understood that the invention is not limited to the details of construction or process steps set forth in the following description. The invention is capable of other embodiments and of being practiced in various ways.

EXAMPLES

The following non-limiting examples shall serve to illustrate the various embodiments of the present invention. In each of the examples, the carrier was cordierite.

Example 1

A composite having a catalytic material was prepared using three layers: an inner layer, a middle layer, and an outer layer. In this example, the composition is generally referred to as UC/Pd/Pd (where UC refers to "undercoat"). The layered catalyst composite contained palladium with a total precious metal loading of 106 g/ft$^3$ and with a Pt/Pd/Rh ratio of 0/106/0. The substrate had a volume of 51.2 in$^3$ (0.84 L), a cell density of 600 cells per square inch, and a wall thickness of approximately 100 μm. The catalytic material as a whole had an OSC content of 12% by weight. The layers were prepared as follows:

Inner Layer

The components present in the inner layer were high surface area gamma alumina, a ceria-zirconia composite with 45% ceria by weight, zirconium oxide, and a binder, at concentrations of approximately 23.3%, 70.0%, 4.7%, and 2.3%, respectively, based on the calcined weight of the catalyst. The total loading of the inner layer was 1.08 g/in$^3$. The zirconium oxide was introduced as an acetate colloidal solution. The OSC (oxygen storage component) content in the layer was approximately 33%.

An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried and then calcined at a temperature of 500° C. for about 1 hour.

Middle Layer

The components present in the middle layer were a first high surface area gamma alumina that is lanthana-stabilized, a second high surface area gamma alumina, a ceria-zirconia composite with 45% ceria by weight, palladium, and barium oxide, at concentrations of approximately 54.6%, 27.3%, 13.7%, 1.7%, and 2.7%, respectively, based on the calcined weight of the catalyst. The barium oxide was introduced as an acetate colloidal solution. The total loading of the middle layer was 1.83 g/in$^3$. The OSC content in the layer was approximately 6%.

Palladium in the form of a palladium nitrate solution was impregnated by planetary mixer (P-mixer) onto the stabilized aluminas to form a wet powder while achieving incipient wetness. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

Outer Layer

The outer layer had the same composition, slurry preparation, and loading as the middle layer of this example.

Example 2

A composite having a catalytic material was prepared using three layers: an inner layer, a middle layer, and an outer layer. In this example, the composition is generally referred to as UC/Pd/Pd (where UC refers to "undercoat"). The layered catalyst composite contained palladium with a total precious metal loading of 106 g/ft$^3$ and with a Pt/Pd/Rh ratio of 0/106/0. The substrate had a volume of 51.2 in$^3$ (0.8 L), a cell density of 600 cells per square inch, and a wall thickness of approximately 100 μm. The catalytic material as a whole had an OSC content of 22% by weight. The layers were prepared as follows:

Inner Layer

The inner layer had the same composition, slurry preparation, and loading as the inner layer of Example 1.

Middle Layer

The components present in the middle layer were lanthana-stabilized high surface area gamma alumina, a ceria-zirconia composite with 45% ceria by weight, palladium, and barium oxide, at concentrations of approximately 54.6%, 41.0%, 1.7%, and 2.7%, respectively, based on the calcined weight of the catalyst. The barium oxide was introduced as an acetate colloidal solution. The total loading of the middle layer was 1.83 g/in$^3$. The OSC content in the layer was approximately 19%.

Palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

Outer Layer

The outer layer had the same composition, slurry preparation, and loading as the middle layer of this example.

Example 3

A composite having a catalytic material was prepared using three layers: an inner layer, a middle layer, and an outer layer. In this example, the composition is generally referred to as UC/Pd/Pd (where UC refers to "undercoat"). The layered catalyst composite contained palladium with a total precious metal loading of 106 g/ft$^3$ and with a Pt/Pd/Rh ratio of 0/106/0. The substrate had a volume of 51.2 in$^3$ (0.84 L), a cell density of 600 cells per square inch, and a wall thickness of approximately 100 μm. The catalytic material as a whole had an OSC content of 32% by weight. The layers were prepared as follows:

Inner Layer

The inner layer had the same composition, slurry preparation, and loading as the inner layer of Example 1.

Middle Layer

The components present in the middle layer were lanthana-stabilized high surface area gamma alumina, a ceria-zirconia composite with 45% ceria by weight, palladium, and barium oxide, at concentrations of approximately 27.3%, 68.3%, 1.7%, and 2.7%, respectively, based on the calcined weight of the catalyst. The barium oxide was introduced as an acetate colloidal solution. The total loading of the middle layer was 1.83 g/in$^3$. The OSC content in the layer was approximately 32%.

Palladium in the form of a palladium nitrate solution was impregnated by planetary mixer (P-mixer) onto the stabilized aluminas to form a wet powder while achieving incipient wetness. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

Outer Layer

The outer layer had the same composition, slurry preparation, and loading as the middle layer of this example.

Example 4

Testing

The catalyst composites prepared in Examples 1, 2, and 3 were simultaneously engine-aged with exothermic aging resulting in bed temperatures of approximately 1050° C. for 80 hours. After aging, the composites were evaluated on an engine dynamometer pursuant to standard test MVEG-B. Phase 1, 2, and 3 bag emissions were analyzed.

Table 1 depicts emissions of HC and NO$_x$ under simulated exhaust conditions for exemplary catalysts. Examples 1 and 2 show that increased oxygen storage capacity improves NO$_x$ conversion.

TABLE 1

| | Oxygen Storage Capacity mg O$_2$* | HC g/km | NO$_x$ g/km | CO, g/km |
|---|---|---|---|---|
| Example 1 | 146 | 0.066 | 0.092 | 0.625 |
| Example 2 | 242 | 0.064 | 0.070 | 0.590 |
| Example 3 | 493 | 0.061 | 0.059 | 0.569 |

*at 32 m$^3$/hour at 575° C.

Example 5

A composite having a catalytic material was prepared using three layers: an inner layer, a middle layer, and an outer layer. In this example, the composition is generally referred to as UC/Pd/Pd (where UC refers to "undercoat"). The layered catalyst composite contained palladium with a total precious metal loading of 106 g/ft$^3$ and with a Pt/Pd/Rh ratio of 0/106/0. The substrate had a volume of 51.2 in$^3$ (0.84 L), a cell density of 600 cells per square inch, and a wall thickness of approximately 100 μm. The catalytic material as a whole had an OSC content of 19% by weight. The layers were prepared as follows:

Inner Layer

The inner layer had the same composition, slurry preparation, and loading as the inner layer of Example 1.

Middle Layer

The components present in the middle layer were lanthana-stabilized high surface area gamma alumina, a ceria-zirconia composite with 45% ceria by weight, a ceria-zirconia composite with 28% ceria by weight, palladium, and barium oxide, at concentrations of approximately 53.4%, 26.7%, 13.4%, 1.2%, and 5.3%, respectively, based on the calcined weight of the catalyst. The barium oxide was introduced as an acetate colloidal solution. The total loading of the middle layer was 1.83 g/in$^3$. The OSC content in the layer was approximately 17%.

Palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

Outer Layer

The components present in the outer layer were zirconium-stabilized high surface area gamma alumina, a first ceria-zirconia composite with 45% ceria by weight, a second ceria-zirconia composite with 45% ceria by weight, palladium, and barium oxide, at concentrations of approximately 63.2%, 14.4%, 14.4%, 2.3%, and 5.8%, respectively, based on the calcined weight of the catalyst. A portion of the barium oxide was introduced as a hydroxide colloidal solution; the remaining was introduced as a nitrate colloidal solution. The total loading of the outer layer was 1.74 g/in$^3$. The OSC content in the layer was approximately 13%.

An amount of 80% of the palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The remaining 20% of the palladium in the form of palladium nitrate was added in an aqueous acetate-containing slurry. The slurry was coated onto the cordierite carrier over the middle layer using deposition methods known in the art for depositing the catalyst on a cordierite substrate. After coating, the carrier plus the inner, middle, and outer layers were dried, and then calcined at a temperature of 550° C. for about 1 hour.

Example 6

A composite having a catalytic material was prepared using two layers: an inner layer and an outer layer. The layered catalyst composite contained palladium with a total precious metal loading of 106 g/ft$^3$ and with a Pt/Pd/Rh ratio of 0/106/0. The substrate had a volume of 51.2 in$^3$ (0.84 L), a cell density of 600 cells per square inch, and a wall thickness of approximately 100 μm. The catalytic material as a whole had an OSC content of 24% by weight. The layers were prepared as follows:

Inner Layer

The components present in the inner layer were lanthana-stabilized high surface area gamma alumina, a first ceria-zirconia composite with 45% ceria, palladium, and barium oxide, at concentrations of approximately 21.8%, 72.6%, 0.8%, and 4.8%, respectively, based on the calcined weight of the catalyst. The barium oxide was introduced as an acetate colloidal solution. The total loading of the inner layer was 2.07 g/in$^3$. The OSC content in the layer was approximately 34% based on the ceria.

Palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The slurry was coated onto the cordierite carrier using deposition methods known in the art for depositing the catalyst on a cordierite substrate. After coating, the carrier plus the inner layer were dried, and then calcined at a temperature of 550° C. for about 1 hour.

Outer Layer

The components present in the outer layer were zirconium-stabilized high surface area gamma alumina, a first ceria-zirconia composite with 45% ceria by weight, a second ceria-zirconia composite with 45% ceria by weight, palladium, strontium oxide, and barium oxide, at concentrations of approximately 59.5%, 13.5%, 13.5%, 2.4%, 5.4%, and 5.6%, respectively, based on the calcined weight of the catalyst. A portion of the barium oxide was introduced as a hydroxide colloidal solution; the remaining was introduced as a nitrate colloidal solution. The strontium oxide was introduced as an acetate colloidal solution. The total loading of the outer layer was 1.85 g/in$^3$. The OSC content in the layer was approximately 12%.

Palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and outer layers were dried, and then calcined at a temperature of 550° C. for about 1 hour.

Example 7

A composite having a catalytic material was prepared using two layers: an inner layer and an outer layer. The layered catalyst composite contained palladium with a total precious metal loading of 106 g/ft$^3$ and with a Pt/Pd/Rh ratio of 0/106/0. The substrate had a volume of 51.2 in$^3$ (0.84 L), a cell density of 600 cells per square inch, and a wall thickness of approximately 100 μm. The catalytic material as a whole had an OSC content of 34% by weight. The layers were prepared as follows:

Inner Layer

The components present in the inner layer were lanthana-stabilized high surface area gamma alumina, a ceria-zirconia composite with 45% ceria, palladium, and barium oxide, at concentrations of approximately 21.6%, 72.1%, 1.5%, and 4.8%, respectively, based on the calcined weight of the catalyst. The barium oxide was introduced as an acetate colloidal solution. The total loading of the inner layer was 2.08 g/in$^3$. The OSC content in the layer was approximately 34%.

An amount of one-third of the palladium in the form of a palladium nitrate solution was impregnated by planetary mixer (P-mixer) onto the stabilized alumina to form a wet powder while achieving incipient wetness. Another amount of one-third of the palladium in the form of a palladium nitrate solution was impregnated by P-mixer onto the ceria-zirconia composite to form a wet powder while achieving incipient wetness. An aqueous slurry was formed by combining all of the above components with water, and milling to a particle size of 90% less than 10 microns. The remaining third of the palladium was added to the slurry. The slurry was coated onto the cordierite carrier using deposition methods known in the art for depositing the catalyst on a cordierite substrate. After coating, the carrier plus the inner layer were dried, and then calcined at a temperature of 550° C. for about 1 hour.

Outer Layer

The outer layer had the same composition, slurry preparation, and loading as the inner layer of this example.

Example 8

Comparative Example

A composite having a catalytic material was prepared using two layers: an inner layer and an outer layer. This composite was made in accordance with the teachings of U.S. Pat. No. 5,597,771 to provide a first layer having intimate contact between Pd and Ce and a second layer having no intimate contact between Pd and Ce. The layered catalyst composite contained palladium with a total precious metal loading of 106 g/ft$^3$ and with a Pt/Pd/Rh ratio of 0/106/0. The substrate had a volume of 51.2 in$^3$ (0.84 L), a cell density of 600 cells per square inch, and a wall thickness of approximately 100 μm. The catalytic material as a whole had an OSC content of 26% by weight. The layers were prepared as follows:

Inner Layer

The inner layer had the same composition, slurry preparation, and loading as the inner layer of Example 7.

Outer Layer

The components present in the outer layer were lanthana-stabilized high surface area gamma alumina, a ceria-zirconia composite with 45% ceria by weight, palladium, and barium oxide, at concentrations of approximately 56.2%, 36.5%, 1.7%, and 5.6%, respectively, based on the calcined weight of the catalyst. A portion of the barium oxide was introduced as a hydroxide colloidal solution; the remaining was introduced as a nitrate colloidal solution. The total loading of the inner layer was 1.79 g/in$^3$. The OSC content in the layer was approximately 17%.

Palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. Chemical analysis of the supernatant of the slurry showed less than 10 ppm palladium in solution. The slurry was coated onto the cordierite carrier using deposition methods known in the art for depositing the catalyst on a cordierite substrate. After coating, the carrier plus the inner layer were dried, and then calcined at a temperature of 550° C. for about 1 hour.

Example 9

Comparative Example

A composite having a catalytic material was prepared using two layers: an inner layer and an outer layer. This composite was made in accordance with the teachings of U.S. Pat. No. 5,597,771 to provide a first layer having intimate contact between Pd and Ce and a second layer having no intimate contact between Pd and Ce. The layered catalyst composite contained palladium with a total precious metal loading of 106 g/ft³ and with a Pt/Pd/Rh ratio of 0/106/0. The substrate had a volume of 51.2 in³ (0.84 L), a cell density of 600 cells per square inch, and a wall thickness of approximately 100 μm. The catalytic material as a whole had an OSC content of 20% by weight. The layers were prepared as follows:

Inner Layer

The components present in the inner layer were lanthana-stabilized high surface area gamma alumina, a ceria-zirconia composite with 28% ceria by weight, palladium, and barium oxide, at concentrations of approximately 21.6%, 72.1%, 1.5%, and 4.8%, respectively, based on the calcined weight of the catalyst. The barium oxide was introduced as an acetate colloidal solution. The total loading of the inner layer was 2.08 g/in³. The OSC content in the layer was approximately 25%.

An amount of one-third of the palladium in the form of a palladium nitrate solution was impregnated by planetary mixer (P-mixer) onto the stabilized alumina to form a wet powder while achieving incipient wetness. Another amount of one-third of the palladium in the form of a palladium nitrate solution was impregnated by P-mixer onto the ceria-zirconia composite to form a wet powder while achieving incipient wetness. An aqueous slurry was formed by combining all of the above components with water, and milling to a particle size of 90% less than 10 microns. The remaining third of the palladium was added to the slurry. The slurry was coated onto the cordierite carrier using deposition methods known in the art for depositing the catalyst on a cordierite substrate. After coating, the carrier plus the inner layer were dried, and then calcined at a temperature of 550° C. for about 1 hour.

Outer Layer

The components present in the outer layer were lanthana-stabilized high surface area gamma alumina, a ceria-zirconia composite with 28% ceria by weight, palladium, and barium oxide, at concentrations of approximately 56.2%, 36.5%, 1.7%, and 5.6%, respectively, based on the calcined weight of the catalyst. A portion of the barium oxide was introduced as a hydroxide colloidal solution; the remaining was introduced as a nitrate colloidal solution. The total loading of the inner layer was 1.78 g/in³. The OSC content in the layer was approximately 13%.

Palladium in the form of a palladium nitrate solution was impregnated by planetary mixer (P-mixer) onto the stabilized alumina to form a wet powder while achieving incipient wetness. An aqueous slurry was formed by combining all of the above components with water, and milling to a particle size of 90% less than 10 microns. Chemical analysis of the supernatant of the slurry showed less than 10 ppm palladium in solution. The slurry was coated onto the cordierite carrier using deposition methods known in the art for depositing the catalyst on a cordierite substrate. After coating, the carrier plus the inner layer were dried, and then calcined at a temperature of 550° C. for about 1 hour.

Example 10

Testing

Full-sized catalyst composites were prepared in Examples 5, 6, 7, 8, and 9. Core samples of 1"×1.5" were taken from the full-sized catalyst composites, and were aged with a lab furnace aging at approximately 1050° C. for 12 hours in 10% steam air. After aging, the composites were evaluated using a laboratory reactor system with various test protocols, including OBD delay time, model lambda transients, and simulated MVEG drive cycles.

HC/CO/NO$_x$ conversions were measured while the temperature was rapidly raised to 500° C. Hydrocarbon, CO, and NO$_x$ concentrations were measured using a Fourier Transform Infrared (FTIR) analyzer.

With regard to OBD delay time testing from lean to rich, Examples 5 and 6 each showed a delay of 5.5 seconds, Examples 7 and 8 each showed a delay of 7 seconds, and reference Example 9 showed a delay of 4 seconds.

Table 2 shows residual emissions from a simulated MVEG test, collecting cold start emissions from Bag 1 containing emissions from the first 195 seconds of the cycle.

TABLE 2

|  | HC Residual % | CO Residual % | NO$_x$ Residual % |
|---|---|---|---|
| Example 5 | 7.9 | 8.5 | 9.4 |
| Example 6 | 7.2 | 8.5 | 8.9 |
| Example 7 | 8.4 | 9.7 | 10.4 |
| Example 8 | 8.3 | 10.2 | 10.0 |
| Example 9 | 9.9 | 12.5 | 10.8 |

Table 3 shows residual emissions from a simulated MVEG test, collecting total emissions.

TABLE 3

|  | HC Residual % | CO Residual % | NO$_x$ Residual % |
|---|---|---|---|
| Example 5 | 1.6 | 3.9 | 7.2 |
| Example 6 | 1.8 | 5.1 | 7.0 |
| Example 7 | 1.7 | 5.0 | 6.7 |
| Example 8 | 1.7 | 4.4 | 7.0 |
| Example 9 | 2.4 | 6.3 | 7.9 |

Table 4 shows residual emissions from a simulated dynamic response test that repeatedly cycled from stoichiometric, to lean, to rich, and back to stoichiometric.

TABLE 4

|  | HC Residual % | CO Residual % | NO$_x$ Residual % |
|---|---|---|---|
| Example 5 | 1.0 | 2.8 | 9.2 |
| Example 6 | 1.1 | 2.6 | 9.1 |
| Example 7 | 0.8 | 1.1 | 4.3 |
| Example 8 | 1.0 | 2.7 | 7.9 |
| Example 9 | 1.5 | 8.8 | 11.7 |

Aged catalysts from Examples 7, 8, and 9 were evaluated using a simulation of a GM Saturn Model Year 2004 engine according to the US FTP-75 testing procedure. The total amount of hydrocarbons, carbon monoxide, and nitrogen oxides was measured by collecting the first two bags. The results of the evaluations showing residual percentages of HC, CO, and NO$_x$ are set forth in Tables 5 and 6, for cold start 120 seconds and total of bags 1 and 2, respectively.

TABLE 5

| Cold Start Example | HC Residual % | CO Residual % | NO$_x$ Residual % |
|---|---|---|---|
| 7 | 47.4 | 41.6 | 16.8 |
| 8 | 49.7 | 43.0 | 46.2 |
| 9 | 54.0 | 46.2 | 27.1 |

TABLE 6

| Total Bags 1 & 2 Example | HC Residual % | CO Residual % | NO$_x$ Residual % |
|---|---|---|---|
| 7 | 7.1 | 6.2 | 0.7 |
| 8 | 8.9 | 6.9 | 1.1 |
| 9 | 9.9 | 7.9 | 3.8 |

The catalyst from Example 7 showed improved reduction in emissions for both cold start and total compared to Examples 8 and 9. Comparing Example 7 with Example 9, NO$_x$ emissions were reduced by about 80% or a factor of about 5, CO emissions were reduced by about 22%, and HC emissions were reduced by about 28%.

Example 11

Comparative Example

An exhaust treatment system was formed from catalyst composites made as follows, and can be referred to as the Pd/Rh+Pd/Rh system. An upstream catalyst composite contained a two-layered catalyst having palladium and OSC in the first layer and rhodium and OSC in the second layer. The upstream composite had a total precious metal loading of 40 g/ft$^3$ and with a Pt/Pd/Rh ratio of 0/36/4. The upstream substrate had a volume of 40.9 in$^3$ (0.67 L), a cell density of 900 cells per square inch, and a wall thickness of approximately 2.5 mils (63.5) μm. A downstream catalyst composite contained the same two-layered catalyst material of the upstream composite, with a total precious metal loading of 8 g/ft$^3$ and with a Pt/Pd/Rh ratio of 0/4/4. The downstream substrate had a volume of 40.9 in$^3$ (0.67 L), a cell density of 400 cells per square inch, and a wall thickness of approximately 4 mils (102) μm. The composites were aged by exothermic engine aging for 100 hours with a maximum bed temperature of 1000° C.

Example 12

An exhaust treatment system was formed from catalyst composites made according to the formula and methods of Example 5 and can be referred to as the Pd+Pd system. An upstream catalyst composite contained palladium with a total precious metal loading of 92 g/ft$^3$ and with a Pt/Pd/Rh ratio of 0/92/0. The upstream substrate had a volume of 40.9 in$^3$ (0.67 L), a cell density of 900 cells per square inch, and a wall thickness of approximately 2.5 mils (63.5) μm. A downstream catalyst composite contained palladium with a total precious metal loading of 60 g/ft$^3$ and with a Pt/Pd/Rh ratio of 0/60/0. The downstream substrate had a volume of 40.9 in$^3$ (0.67 L), a cell density of 400 cells per square inch, and a wall thickness of approximately 4 mils (102) μm. The composites were aged by exothermic engine aging for 100 hours with a maximum bed temperature of 1000° C.

Example 13

An exhaust treatment system was formed from catalyst composites made as follows and can be referred to as the Pd+Pd/Rh system. An upstream catalyst composite was formed according to the formula and methods of Example 5. The upstream composite contained palladium with a total precious metal loading of 116 g/ft$^3$ and with a Pt/Pd/Rh ratio of 0/116/0. The upstream substrate had a volume of 40.9 in$^3$ (0.67 L), a cell density of 900 cells per square inch, and a wall thickness of approximately 2.5 mils (63.5) μm. A downstream catalyst composite was formed from a three-layered catalyst material containing palladium and rhodium, with a total precious metal loading of 10 g/ft$^3$ and with a Pt/Pd/Rh ratio of 0/8/2. The first layer of the three-layered catalyst contained an undercoat of alumina and OSC, a middle coat deposited on the undercoat of alumina, palladium, and OSC, and a top coat deposited on the middle coat of alumina, rhodium, and OSC. The downstream substrate had a volume of 40.9 in$^3$ (0.67 L), a cell density of 400 cells per square inch, and a wall thickness of approximately 4 mils (102) μm. The composites were aged by exothermic engine aging for 100 hours with a maximum bed temperature of 1000° C.

Example 14

Testing

Catalyst systems of Examples 11, 12, and 13 were prepared to be cost neutral by substituting 1 g Rh for 14 g Pd.

The systems were evaluated using a Ford Fusion Model Year 2007 engine according to the US FTP-75 testing procedure. In this evaluation, the maximum speed was 56.6 mph. The maximum space velocity was less than 100,000 hr$^{-1}$. The total amount of hydrocarbons, carbon monoxide, and nitrogen oxides was measured by collecting the bags 1, 2, and 3. The results of the evaluations showing g/km of HC, CO, and NO$_x$ are set forth in Table 7.

TABLE 7

| Example | HC g/km | CO g/km | NO$_x$ g/km |
|---|---|---|---|
| 11 | 0.045 | 0.055 | 0.072 |
| 12 | 0.02 | 0.032 | 0.058 |
| 13 | 0.019 | 0.029 | 0.043 |

As shown in Table 7, the Pd+Pd system of Example 12 showed improvement over the Pd/Rh+Pd/Rh system of Example 11 for HC, CO, and NO$_x$. The Pd+Pd system of Example 12 was comparable to the Pd+Pd/Rh system of Example 13 for HC and CO performance, with a slight decrease in NO$_x$ performance.

Catalyst systems of Examples 11, 12, and 13 were also evaluated using a Ford Fusion Model Year 2007 engine according to the US-06 testing procedure. In this evaluation, the maximum speed was 80 mph. The maximum space velocity was greater than 150,000 hr$^{-1}$ up to 250,000 hr$^{-1}$. The total amount of hydrocarbons, carbon monoxide, and nitrogen oxides was measured by collecting tailpipe emissions. The results of the evaluations showing g/km of HC, CO, and NO$_x$ are set forth in Table 8.

TABLE 8

| Example | HC g/km | CO g/km | NO$_x$ g/km |
|---|---|---|---|
| 11 | 0.059 | 0.028 | 0.024 |
| 12 | 0.019 | 0.032 | 0.089 |
| 13 | 0.016 | 0.021 | 0.024 |

As shown in Table 8, which depicts testing results achieved at a higher space velocity than those of Table 7, the Pd+Pd system of Example 12 showed improvement over the Pd/Rh+Pd/Rh system of Example 11 for HC and CO, but not for NO$_x$. The Pd+Pd/Rh system of Example 13 showed improvement for HC, CO, and NO$_x$ compared to both the Pd+Pd system of Example 12 and the Pd/Rh+Pd/Rh system of Example 11. It was not expected that the low amount of Rh provided by the Pd/Rh downstream composite in conjunction with the Pd only upstream composite of Example 13 would be sufficient to provide $NO_x$ conversion comparable to a system having higher levels of Rh in both the upstream and downstream composites of Example 11. Therefore, a low-Rh loaded Pd/Rh downstream composite can be used in conjunction with an upstream Pd composite to provide excellent $NO_x$ conversion at high space velocity.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. An exhaust system effective to substantially simultaneously oxidize carbon monoxide and hydrocarbons and reduce nitrogen oxides, the system comprising a combination of a first composite and a second composite, wherein the first composite comprises a precious metal that is a palladium component and an oxygen storage component that comprises at least a first ceria-zirconia composite and a second ceria-zirconia composite, the oxygen storage component being present in an amount of at least 10% by weight, wherein substantially all of the oxygen storage component is in intimate contact with the palladium component; wherein the first composite is substantially free of other precious metal components; and the second composite comprises a catalytic material having a rhodium component present in a low amount;
    wherein the first composite comprises a first catalytic material on a carrier, the first catalytic material comprising at least two layers, the first catalytic material comprising:
    an inner layer above the carrier comprising the palladium component in an amount in the range of 30 to 70% by weight of palladium in the catalytic material, a first high surface area refractory metal oxide support, the first ceria-zirconia composite, and one or more of a promoter, stabilizer, or binder; and
    an outer layer deposited on the inner layer comprising the palladium component in an amount in the range of 30 to 70% by weight of palladium in the catalytic material, a second high surface area refractory metal oxide support different from the first high surface area refractory metal oxide support, the second ceria-zirconia composite, and one or more of a promoter, stabilizer, or binder.

2. The exhaust system of claim 1, wherein the first composite is located upstream of the second composite.

3. The exhaust system of claim 1, wherein the rhodium component is present in an amount of no more than 2 g/ft³.

4. The exhaust system of claim 1, wherein the second composite further comprises a precious metal component selected from palladium, platinum, or both.

5. The exhaust system of claim 1, wherein ceria is present in the first composite is in an amount in the range of 20 to 50%.

6. The exhaust system of claim 1, wherein a molar ratio of palladium to cerium in intimate contact in the first composite is in the range of 1:3000 to 1:30.

7. The exhaust system of claim 1, wherein the first ceria-zirconia composite and the second ceria-zirconia composite each independently comprises ceria in an amount of at least 5% by weight of the ceria-zirconia composite.

8. The exhaust system of claim 7, wherein the first ceria-zirconia composite and the second ceria-zirconia composite each independently further comprises lanthana, neodymia, praseodymia, samarium, yttria, or combinations thereof.

9. The exhaust system of claim 8, wherein the first ceria-zirconia composite or the second ceria-zirconia composite comprises lanthana in an amount in the range of 1-10% by weight to the ceria-zirconia composite.

10. The exhaust system of claim 7, wherein the palladium component is associated onto the first ceria-zirconia composite and the second ceria-zirconia composite each independently in an amount of at least 0.1% by weight of the ceria-zirconia composite.

11. The exhaust system of claim 1, wherein the first high surface area refractory metal oxide and the second high surface area refractory metal oxide each independently comprises an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria.

12. The exhaust system of claim 1, wherein the first composite further comprises a promoter selected from the group consisting of BaO, SrO, $La_2O_3$, $Nd_2O_3$, $Pr_6O_{11}$, $Y_2O_3$, $Sm_2O_3$, and combinations thereof.

13. The exhaust system of claim 12 wherein emissions of carbon monoxide, hydrocarbons, and nitrogen oxides are that same or reduced under high space velocity as compared to a comparative composite comprising the first composite and a second composite that is free of rhodium.

14. The exhaust system of claim 1, wherein the first composite comprises three layers of catalytic material on the carrier, the catalytic material further comprising:
    an undercoat layer deposited on the carrier and below the inner layer, the undercoat layer comprising a high surface area alumina support in an amount in the range of 10 to 50% by weight of the layer, at least one ceria-zirconia composite in an amount to deliver the oxygen storage component content in the layer in the range of 20 to 40% by weight, one or more of a promoter, stabilizer, or binder, and optionally palladium in an amount in the range of 0 to 15% by weight of palladium in the catalytic material;
    wherein the first high surface area refractory metal oxide support comprises a lanthana-stabilized high surface area alumina support in an amount in the range of 40 to 70% by weight of the inner layer, and the first ceria-zirconia composite being present in an amount to deliver the oxygen storage component content in the layer in the range of 10 to 20% by weight; and
    wherein the second high surface area refractory metal oxide support comprises a zirconia-stabilized high surface area alumina support in an amount in the range of 50 to 80% by weight of the layer, and the second ceria-zirconia composite being present in an amount to deliver the oxygen storage component content in the layer in the range of 10 to 20% by weight.

15. The exhaust system of claim 1, wherein:
the first high surface area refractory metal oxide support comprises a lanthana-stabilized high surface area alumina support in an amount in the range of 10 to 40% by weight of the layer, and the first ceria-zirconia composite being present in an amount to deliver the oxygen storage component content in the layer in the range of 25 to 40% by weight; and
the second high surface area refractory metal oxide support comprises a zirconia-stabilized high surface area alumina support in an amount in the range of 40 to 70% by weight of the layer, and the second ceria-zirconia composite being present in an amount to deliver the oxygen storage component content in the layer in the range of 10 to 20% by weight.

16. The exhaust system of claim 1, wherein the first catalytic material comprises a palladium component in an amount in the range of 0.5 to 2.5% by weight of the catalytic material, a lanthana-stabilized high surface area alumina support in an amount in the range of 10 to 40% by weight of the catalytic material, and the first and the second ceria-zirconia composites being present in an amount to deliver the oxygen storage component content in the catalytic material in the range of 25 to 40% by weight.

* * * * *